Sept. 25, 1973   N. E. KLEIN   3,761,340
ADJUSTABLE AUTOMATIC TIRE BELT DOFFER
Filed April 12, 1971   4 Sheets-Sheet 4
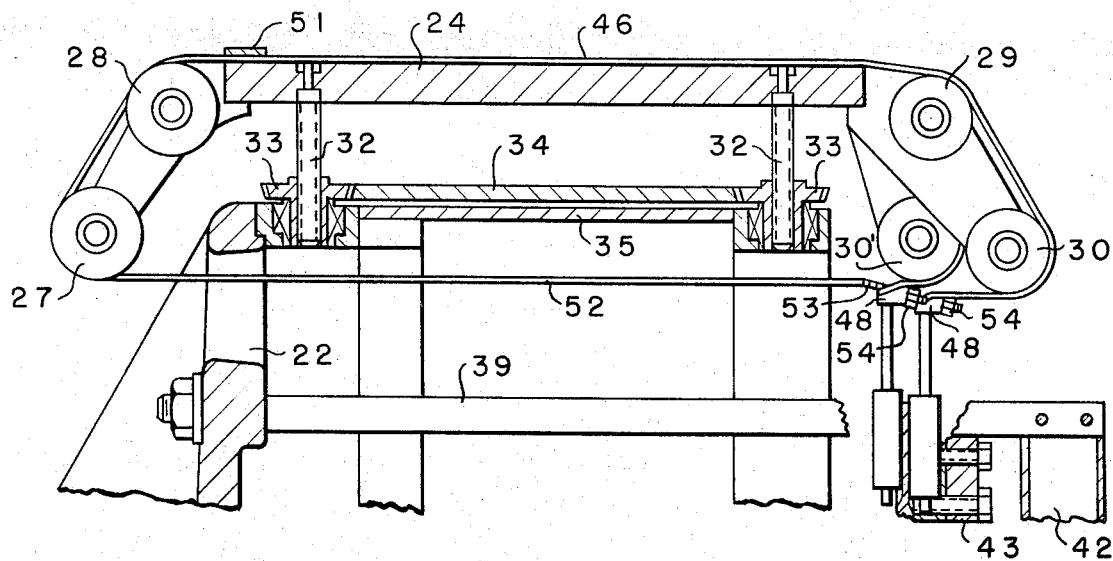
FIG.-4-
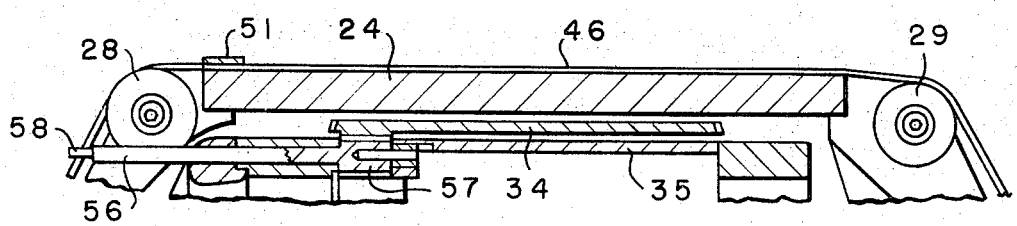
FIG.-5-
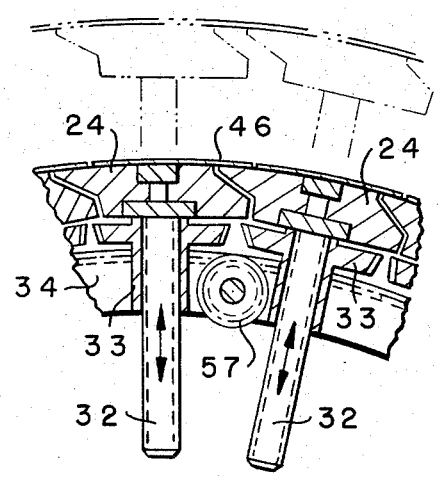
FIG.-6-
INVENTOR.
NORMAN E. KLEIN
BY
*Arthur L. Gibson*
ATTORNEY United States Patent Office 3,761,340
Patented Sept. 25, 1973

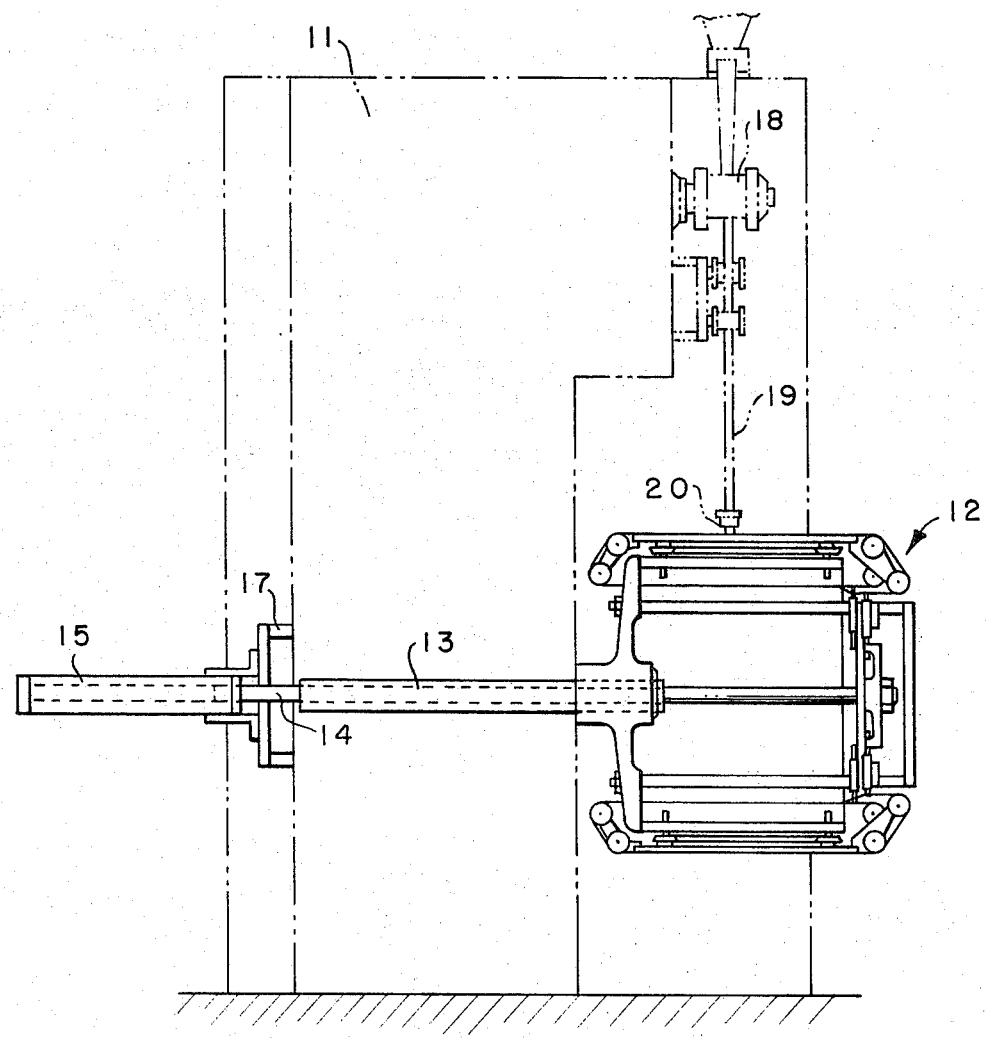
FIG.-1-

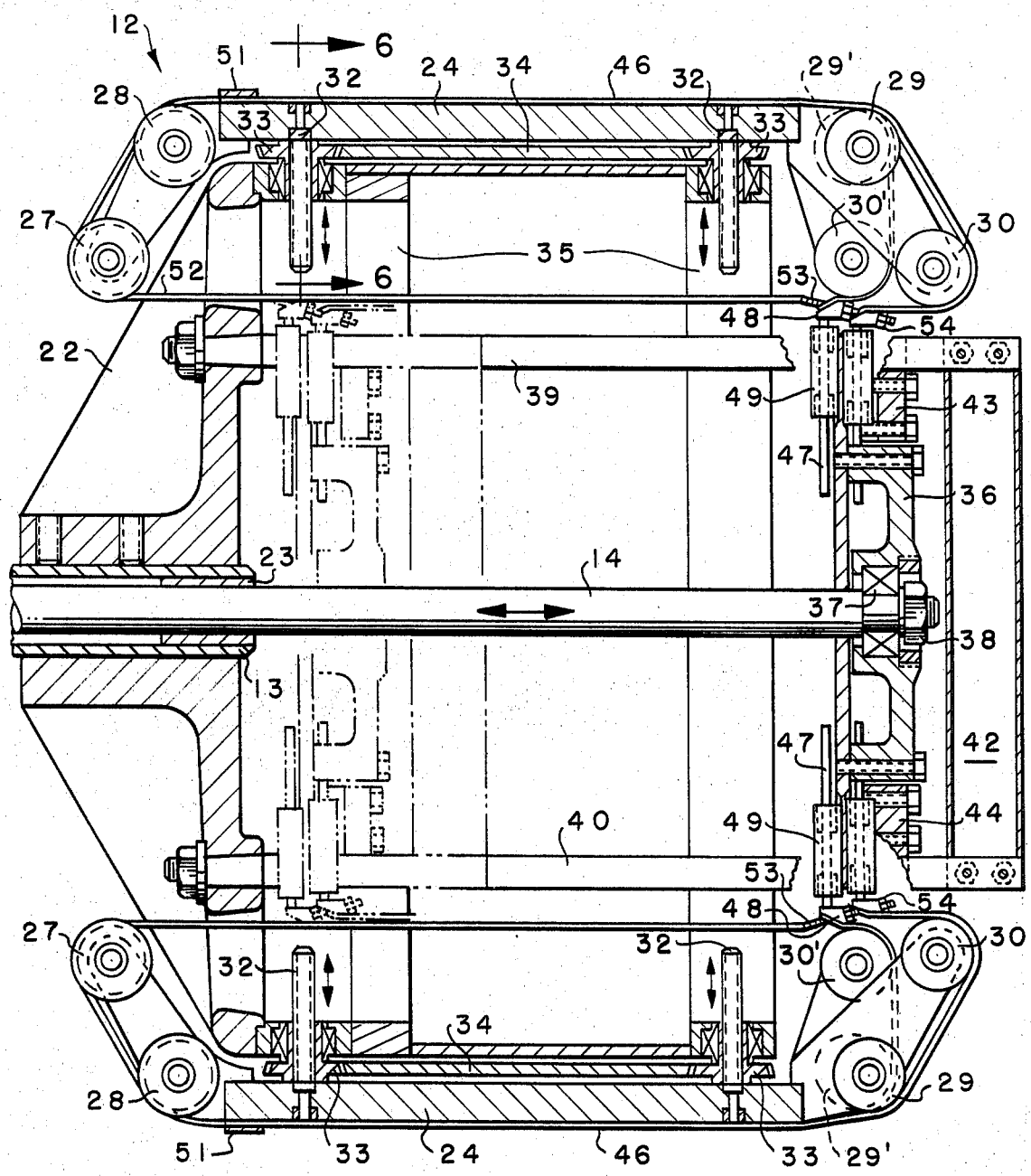
FIG.-2-

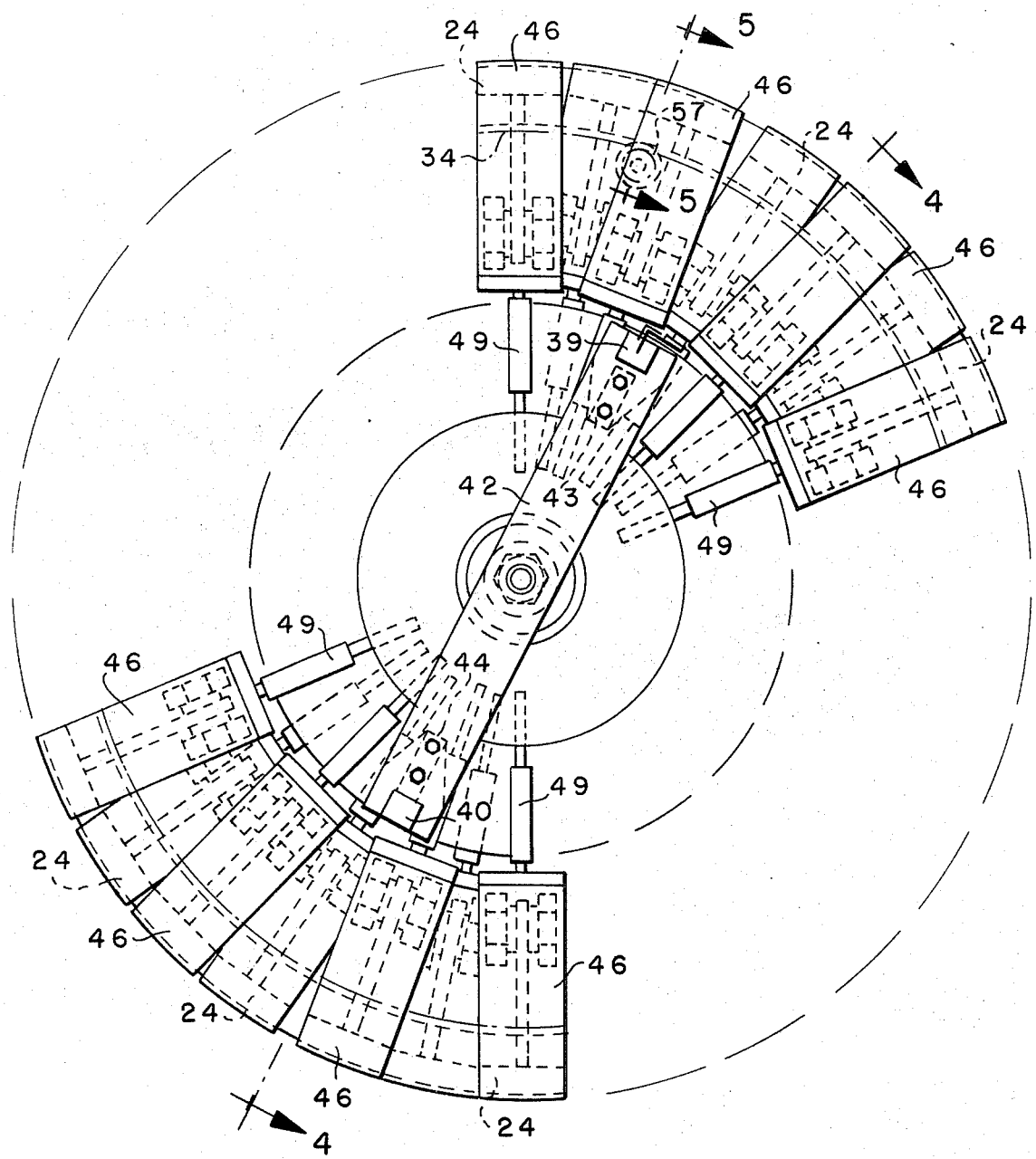
FIG.-3-

3,761,340
ADJUSTABLE AUTOMATIC TIRE BELT DOFFER
Norman E. Klein, Inman, S.C., assignor to Deering Milliken Research Corporation, Spartanburg, S.C.
Filed Apr. 12, 1971, Ser. No. 133,145
Int. Cl. B29h 17/02, 17/16, 17/28
U.S. Cl. 156—397                           12 Claims

ABSTRACT OF THE DISCLOSURE

Apparatus for removing an endless belt from a drum including a belt support surface, means for changing the distance between the support surface and the axis of the drum and means for moving a forward portion of the support surface toward the axis of the drum whereby an endless belt disposed on the support surface is advanced off the end of the drum.

The tire industry has shown considerable interest in tire constructions which include an annular reinforcement or belt about the periphery of the tire between the carcass and tread portions thereof. Such belted tires have better road stability and longer tread life both in radial ply and bias ply carcass constructions.

The annular reinforcements are conventionally formed of cord or wire coated with or embedded in a suitable insulating material such as rubber or some other plastic material which is compatible with and has an adhesive affinity to the rubber of the tire. These coatings serve to prevent direct cord to cord contact by anchoring the cords in a spaced relationship. The reinforcements may be formed from bias cut woven fabric which has been calendered with a layer of unvulcanized rubber. Also, it has been proposed to form endless reinforcements by winding one or more cords onto a rotating drum while employing a reciprocating guide to traverse the drum surface and lay the cord or cords in a generally zigzag pattern thereon. Examples of such belts are disclosed in U.S. Pat. Nos. 2,982,327 and 3,442,874.

Since the rubber or other plastic material employed in combination with the cord is quite tacky and sticky, the endless reinforcement has a high degree of adhesiveness to the drum surface. Because of this adhesive affinity it is difficult to remove the endless belt after the winding or other forming process is completed. If the tackiness of the rubber is reduced by changing the formulation or by other expedients there may be insufficient adhesion between the cord and the drum and between adjacent cords resulting in slippage and the formation of a distorted non-uniform reinforcement. On the other hand, if a sufficient degree of adhesion exists between the rubber coated cord and the drum surface, it is difficult to remove the endless belt from the drum surface without stretching or distorting portions thereof and thereby creating non-uniformity therein.

Various means have been proposed to facilitate doffing of an endless belt from a belt building drum. The removal can be accomplished manually by inserting a wand or stick between the belt and the drum at an angle to force the belt off the rotating drum. Also, the wand may be hollow with an opening at its tip through which air may be expelled to facilitate movement betwen the belt and the drum. In addition, collapsible drums have been tried but the belt tends to adhere to the segments of the drum surface even after it has been collapsed. Although these procedures assist to a degree, the doffing operation is time consuming and requires considerable manual labor with a high degree of skill.

A further consideration in the production of reinforcement belts on a rotating drum is the necessity for having a number of different size drums for different size tires. While expandable drums of various types are known, none of these drums are capable of automatically doffing completed endless belts.

The present invention provides novel apparatus for simply and conveniently removing tacky endless belts from a surface without distorting the belts. Also, the apparatus is of a design which permits endless reinforcements of different circumferences to be produced. Furthermore, the apparatus enables an endless reinforcement to be doffed automatically and at a rapid rate to facilitate integration of the belt building operation into an automated tire building system.

Other advantages and benefits of the invention will be illustrated in greater detail with reference to the accompanying drawings in which:

FIG. 1 is a schematic illustration of one form of apparatus of the invention providing automatic removal of an endless belt;

FIG. 2 is an enlarged side elevation in section of the drum portion of the apparatus shown in FIG. 1;

FIG. 3 is a right end view of the apparatus shown in FIG. 2;

FIG. 4 is a sectional view taken along line 4—4 of FIG. 3;

FIG. 5 is a sectional view taken along line 5—5 of FIG. 3; and

FIG. 6 is a sectional view taken along line 6—6 of FIG. 2.

As shown in the drawings, apparatus of the invention includes a supporting frame 11 in which a drive assembly (not shown) is located. A belt building drum 12 is affixed to one end of a hollow shaft 13 carried by supporting frame 11. A push rod 14 disposed in shaft 13 is attached to a pneumatic cylinder 15 or similar actuating means secured to support frame 11 through bracket 17. Cord coating apparatus 18 is mounted on frame 11 above drum 12. A coated cord or a multicord strip 19 is transferred to the drum 12 by a suitable traversing guide mechanism 20 located adjacent to the drum. The drum 12 which is shown in greater detail in FIGS. 2 and 3 includes a supporting assembly formed by a flange member 22 with a sleeve bearing 23 and a plurality of closely spaced bridge members 24 forming a cylindrical sleeve support in association with the flange 22. Pulleys 27, 28, 29, 29', 30 and 30' are disposed near the ends of bridge members 24. Bridge members 24 are operatively connected to flange 22 through jack screws 32 which extend inwardly from each bridge member toward shaft 14. Internally threaded pinion gears 33 which engage each jack screw 32, are mounted for rotation in a ring 35 secured to the periphery of flange 22. Pinion gears 33 also engage a ring gear 34 disposed adjacent to bridge members 24 and inside the cylindrical sleeve formed by the bridge members. As shown in FIG. 2 the ring gear 34 has bevel gear teeth at each edge which engage pinion gears 33.

At the end of shaft 14 is disposed a thrust hub 36 which is mounted on a step-down portion of push rod 14 through bearing 37 and nut 38. Alignment of thrust hub 36 is maintained by rods 39 and 40 secured to flange 22 at one end and connected by tie bar 42 at their opposite ends. Slotted guide bushings 43 and 44 are located diametrically on thrust hub 36 with the slots of the guide bushings aligned with rods 39 and 40.

A belt support surface, shown in the drawings as a plurality of bands 46, is disposed adjacent the outer surfaces of the bridge members 24 over each bridge member. The bands 46 extend around pulleys 29 and 30 or 29' and 30' of bridge members 24 with the end of each band secured to the end of a push rod 47 through a clamp 48. The bridge members 24 are of two different constructions (FIG. 2) with outer pulleys 29 and 30 and 29' and 30' on the long and short members, respectively.

The different bridge members alternate around the drum periphery so that the forward portions of the bands separate into alternate levels as they move around the pulleys toward the axis of the drum 12. The opposite ends of the bands 46 adjacent to the flange 22 are affixed via cleats 51 to flexible cables 52 which are wrapped around pulleys 27 and 28 disposed at the flange end of bridge members 24. The cables extend through the interior of the drum to cable bolts 53 which pass through clamps 48 secured to the end of push rods 47. The push rods 47 are slidably disposed in guide sleeves 49 secured to the periphery of thrust hub 36. Tension in bands 46 and cables 52 is controlled by the adjustment of nuts 54 on cable bolts 53.

The design of the apparatus of the invention permits changes in the circumference thereof by providing a shaft 56 affixed to a pinion gear 57 which engages interiorly cut teeth of ring gear 34. Shaft 56 is rotatably carried by flange 22 and extends outwardly therefrom to provide an exposed square end 58 for engagement with a wrench or other suitable tool.

In the operation of the apparatus of the invention for the production of reinforcements for belted tires, the circumference of the drum is adjusted to a preselected size. This is accomplished by rotating shaft 56 causing pinion gear 57 affixed to the end of the shaft to move ring gear 34 with which it is in engagement. Since ring gear 34 by virtue of bevel gear teeth at its outer edges also meshes with pinion gears 33 and gears 33 internally engage jack screws 32, rotation of gears 33 causes longitudinal movement of the jack screws. Jack screws 32 being connected to bridge members 24, each bridge member will move away or toward the axis of the drum as shown in FIG. 6. When the desired drum circumference is achieved, the winding of the endless reinforecent is begun.

A coated cord or a plurality of cords in a unitary strip 19 is drawn from extruder 18 and guided by a traversing guide mechanism 20 to position the cord in a desired pattern on the rotating drum surface. Cord is deposited on the drum until a complete reinforcement has been formed. To doff the completed belt, pneumatic cylinder 15 is actuated drawing push rod 14 towards the cylinder and causing thrust hub 36 to move toward flange 22. Since thrust hub 36 carries sleeves 49 with push rods 47, push rods 47 move toward flange 22. Movement of push rods 47 causes bands 46 which are attached thereto by clamps 48 to advance toward the flange 22. At the same time, the forward portions of the bands 46 move toward the axis of the drum 12 around the respective pulleys 29 and 30 or 29' and 30' and then inwardly in a "hairpin" turn. Like-wise, the cables 52 attached to the bands 46 move around pulleys 27 and 28 and over bridge members 24. This movement of the bands 46 around pulleys 29 and 30 or 29' and 30' causes the endless belt which has been formed on bands 46 to advance off the end of the drum. The movement of the thrust hub 36 and the bands 46 connected thereto is aligned by the advance of slotted guide bushings 43 and 44 along rods 39 and 40. As the forward portions of bands 46 move inwardly the bands "peel" from the belt. This avoids undesirable sliding action which may result in stretching or other distortion of the belt. After the belt has been removed, pneumatic cylinder 15 is actuated again to return rod 14 and thrust hub 36 to their original positions. This causes cables 52 to be drawn forward by push rods 47 and returns bands 46 to their original positions on bridge members 24. The apparatus then is ready for the winding of another endless reinforcement which can be doffed when completed in the manner described above by actuating pneumatic cylinder 15.

The above description and drawings show that the present invention provides novel apparatus for producing endless reinforcements of different circumferences. Also, the apparatus permits removal of tacky endless belts therefrom simply and conveniently and without distorting the belts. The design of the apparatus of the invention provides for easy changing of the circumference of the drum surface to meet required specifications. In addition, the apparatus of the invention automatically doffs an endless reinforcement at a very rapid rate to facilitate integration of the belt building operation into an automated tire building system.

It will be apparent from the above description and drawings that various modifications may be made in the detailed designs and procedures described above within the scope of the invention. For example, the means for connecting the bands to the thrust hub and the arrangement of the respective pulleys may be through a semicircular flange-clip instead of individual clamps. Also, the actuation of the jack screws to change the drum circumference may be accomplished by a combination of gears and/or sprockets and/or levers. Therefore, the above description and drawings are intended to illustrate specific embodiments of the invention, and the scope of the invention is to be limited only by the following claims:

That which is claimed is:

1. Apparatus for producing endless belts of different circumferences and for removing the endless belts therefrom including a substantially cylindrical multi-segment support, a plurality of pulleys disposed around the periphery of each end of said cylindrical support, a belt support surface positioned over said cylindrical support with the edges thereof being connected to form a substantial loop extending around said pulleys along the inner and outer surfaces of said cylindrical support, means for changing the circumference of said cylindrical support including adjustment screws extending inwardly from said support segments toward the axis of said drum, means for simultaneously actuating said screws to provide a change in the circumference of said cylindrical support, and means for moving at least a portion of said belt support surface around said peripheral pulleys from the outer surface of said cylindrical support to the inner surface thereof whereby an endless belt disposed on said support surface is advanced off said apparatus.

2. Apparatus according to claim 1 wherein the edges of said support surface are connected by flexible cables.

3. Apparatus according to claim 1 wherein said means for simultaneously actuating said screws includes an arrangement of gears.

4. Apparatus according to claim 3 wherein said gears include a ring gear and pinion gears engaging said adjustment screws.

5. Apparatus according to claim 2 including means for changing the position of said support surface and cables comprising a thrust hub affixed to an axial push rod movable in a longitudinal direction.

6. Apparatus according to claim 1 wherein said belt support surface includes a plurality of adjacent bands.

7. Apparatus according to claim 6 wherein the ends of each band are connected by a flexible cable.

8. Apparatus according to claim 7 including means for adjusting the tension in said bands.

9. Apparatus according to claim 6 wherein each of said cylindrical support segments is a bridge member having pulleys disposed at the ends thereof with the bridge members arranged to provide a substantially continuous cylindrical sleeve support for said bands.

10. Apparatus according to claim 6 wherein said gears include a ring gear with level gear teeth at its edges meshing with pinion gears engaging said adjustment screws.

11. Apparatus according to claim 10 wherein said bands are positioned about the periphery of said substantially continuous cylindrical support with the ends of each band connected by a flexible cable to form an endless loop which is positioned around pulleys disposed adjacent the ends of each bridge member and means operatively connected to said loop to simultaneously change the position of said bands and cables with respect to said support.

12. Apparatus according to claim 10 wherein said pulleys are positioned to separate the forward portions of said bands into alternate levels as said portions contact said pulleys and move toward the axis of said drum.

References Cited

UNITED STATES PATENTS

| | | | |
|---|---|---|---|
| 2,878,857 | 3/1959 | Smith et al. | 156—394 |
| 1,465,769 | 8/1923 | Quin | 156—418 |
| 2,416,523 | 2/1947 | Haren et al. | 156—418 |
| 1,577,664 | 3/1926 | Tew | 156—414 |
| 1,887,187 | 11/1932 | Pfeiffer | 156—417 X |
| 2,936,813 | 5/1960 | Haase | 156—126 |
| 3,532,577 | 10/1970 | Niclas et al. | 156—416 X |
| 3,586,575 | 6/1971 | Wells | 156—394 |

FOREIGN PATENTS

| | | | |
|---|---|---|---|
| 143,277 | 12/1948 | Australia | 156—126 |
| 600,469 | 6/1960 | Canada | 156—126 |

ALFRED L. LEAVITT, Primary Examiner

C. B. COSBY, Assistant Examiner

U.S. Cl. X.R.

156—111, 117, 126, 405, 417; 242—41

PO-1050
(5/69)

UNITED ATES PATENT OFFICE
CERTIFICATE OF CORRECTION

Patent No. 3,761,340        Dated September 25, 1973

Inventor(s) Norman E. Klein

It is certified that error appears in the above-identified patent and that said Letters Patent are hereby corrected as shown below:

Column 4, line 67, the word "level" should read --bevel--.

Signed and sealed this 25th day of December 1973.

(SEAL)
Attest:

EDWARD M. FLETCHER, JR.        RENE D. TEGTMEYER
Attesting Officer        Acting Commissioner of Patents